June 1, 1948.  B. SIMPSON  2,442,620
FOLDING TWO-WHEELED BABY CARRIAGE
Filed Nov. 5, 1945  2 Sheets-Sheet 1
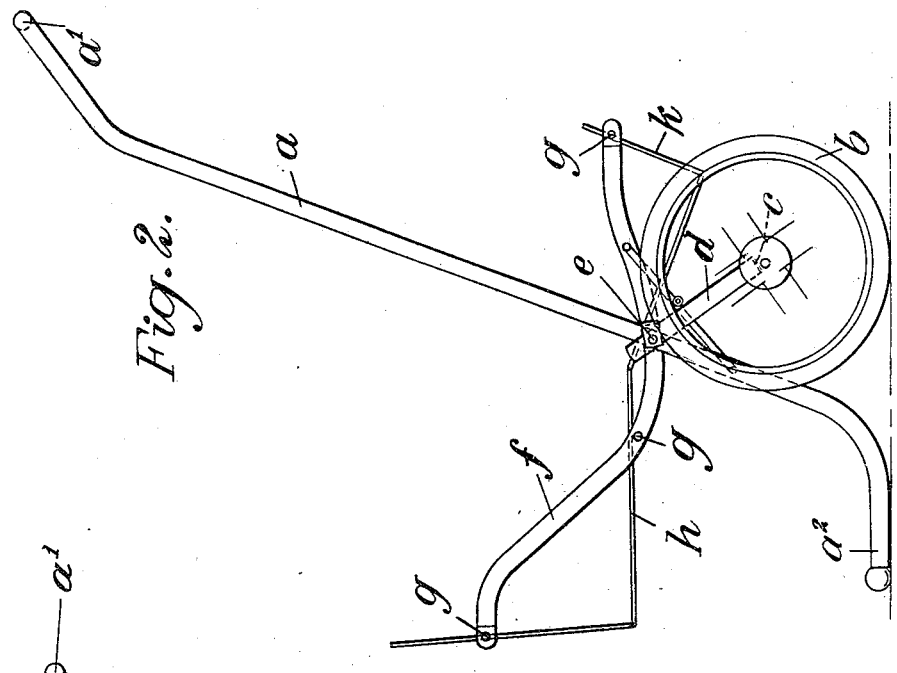
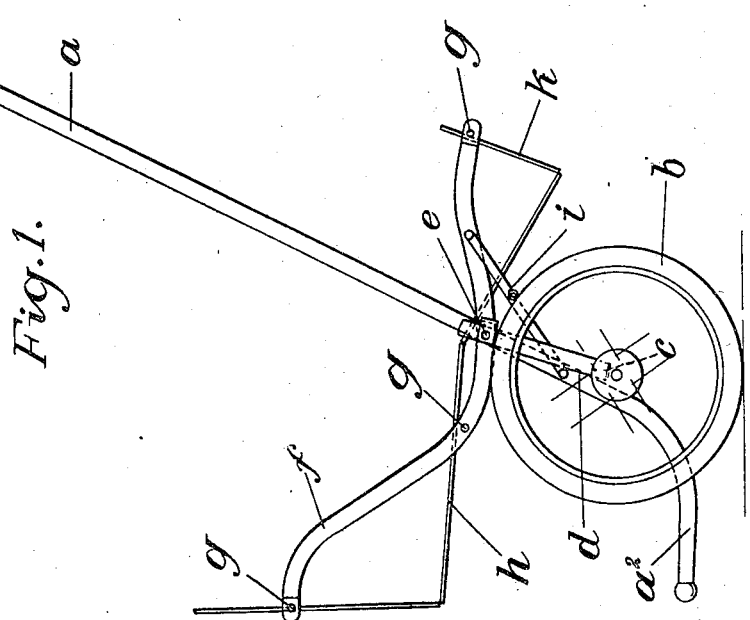
Inventor
B. Simpson
By Hascock Downing Seebold attys June 1, 1948. B. SIMPSON 2,442,620
FOLDING TWO-WHEELED BABY CARRIAGE
Filed Nov. 5, 1945 2 Sheets-Sheet 2
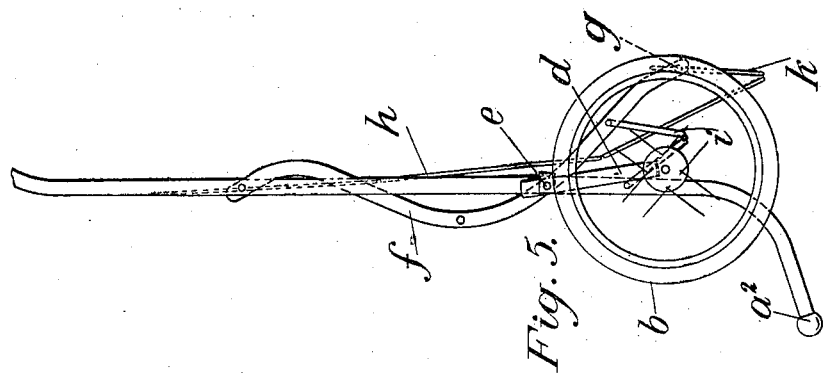
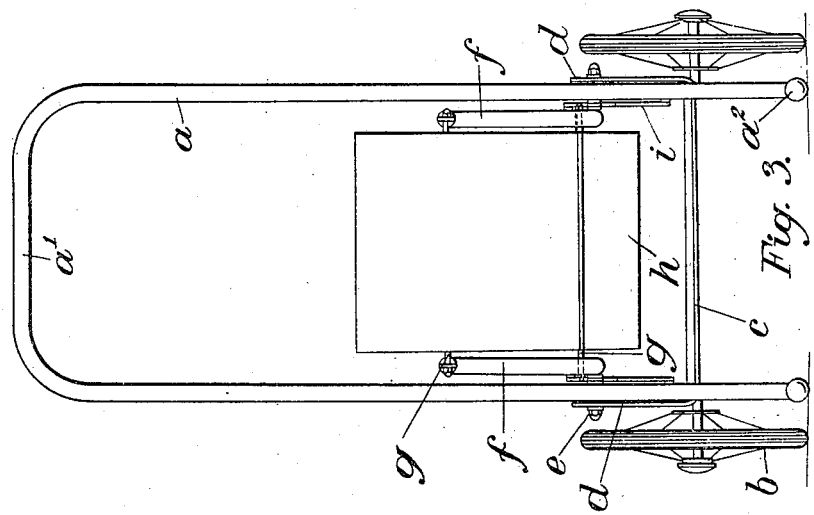
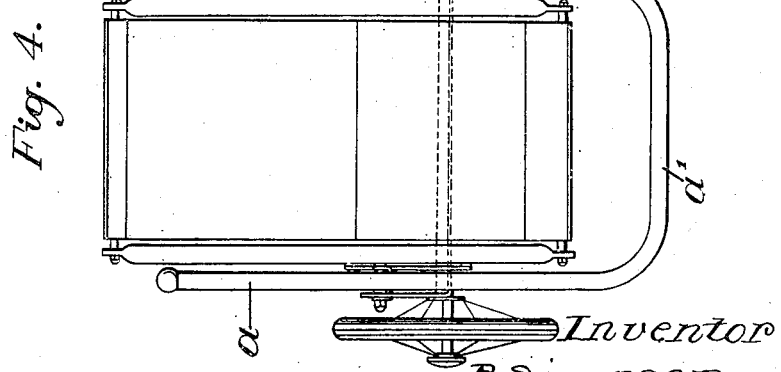
Inventor
B. Simpson Patented June 1, 1948

2,442,620

UNITED STATES PATENT OFFICE 2,442,620

FOLDING TWO-WHEELED BABY CARRIAGE

Barry Simpson, Billacombe, near Plymouth, England, assignor of one-half to Simpson Fawcett & Company Limited, Billacombe, England Application November 5, 1945, Serial No. 626,809
In Great Britain December 18, 1944

3 Claims. (Cl. 280—36)

This invention relates to folding two-wheeled baby carriages and has for its object to provide an improved construction which will not only permit of the vehicle being folded into a compact space for storage or transport but will also enable the weight supported by the device to be disposed in the most advantageous manner and will result in a strong and durable article and one which will be perfectly stable when allowed to stand unattended.

The invention consists in a folding two-wheeled baby carriage comprising in combination a main substantially U-shaped frame, one end of which forms the handle while the other ends form the supporting legs, an auxiliary frame comprising links or a U-member carrying the wheel axle and pivoted to the main frame, a carrier frame also pivoted to the main frame about an axis substantially coincident with the pivotal axis of the auxiliary frame and a foldable link or links or equivalent means connecting the carrier frame to a point or points on the main frame spaced from the pivotal axis of the carrier frame.

The accompanying drawings illustrate one convenient form of baby carriage in accordance with the invention.

Figures 1 and 2 are side elevations showing the baby carriage in the positions it occupies when mobile and when left standing.

Figure 3 is an end elevation.

Figure 4 is a plan, and

Figure 5 shows the device collapsed.

In carrying our invention into effect in one convenient manner we form our improved baby carriage with a main frame $a$ formed of metal tube, rod, or other suitable material and of substantially U form, the upper part $a'$ of the frame serving as the handle by which the vehicle is propelled while the lower ends of the limbs are bent somewhat horizontally as at $a^2$ and are adapted to serve as supports in conjunction with the wheels when the device is required to be left standing. The wheels $b$ are mounted (if necessary or desirable through the intervention of ball bearings) upon a fixed axle $c$ which may be rigidly secured to the ends of the limbs $d$ of which are pivoted in a suitable position as at $e$ upon the side members of the main frame. Also pivoted to the main frame and at a point coincident with the pivotal axis of the auxiliary frame is a carrier frame which may conveniently be formed of two tubular side members $f$ bent into suitable form and united in convenient positions by cross bars $g$ upon which is supported a plywood, leather or other suitable carrier $h$ for the baby. To each side member of the main frame $a$ and at a point preferably below the pivotal axis of the auxiliary frame we pivotally connect one end of a foldable link $i$, the other end of which is pivotally connected to a side member $f$ of the carrier frame at a point to the rear of the point $e$ at which the carrier frame is pivoted to the side frame.

The arrangement is such that when the main frame is moved into a position in which the main and auxiliary frames are substantially in alignment as shown in Figure 1, the weight of the baby will be disposed substantially over the wheel axle and the device may in this position be readily wheeled without any undue exertion on the part of the user.

When the device is to be left standing the main frame is moved forward into the position shown in Figure 2 so that its lower ends rest upon the ground surface and in this position the auxiliary frame is inclined rearwardly of the main frame so that the points of support of the legs and wheels upon the ground surface and the point at which the main and auxiliary frames are pivoted to one another, constitute a substantially triangular structure affording complete stability so that the device may be safely left unattended without developing any tendency to run away.

When the device is to be collapsed for storage or transit the foldable links $i$ are bent as shown in Figure 5, to allow the carrier frame, main frame, and auxiliary frame to assume positions in which they are substantially all in alignment and the device is thus collapsed into a very small compass. If necessary or desirable any suitable locking members may be provided to ensure that the parts will remain locked in any positions in which they may be adjusted although in general with the construction described no such locking means will be necessary. The carrier frame preferably embodies a foot-rest $k$ but it will be understood that the construction of the carrier frame may be varied to suit any practical requirements.

I claim:

1. A folding two-wheeled baby carriage comprising in combination a main substantially U-shaped frame, one end of which forms the handle while the other end forms the supporting legs, an auxiliary frame carrying the wheel axle, a carrier frame pivoted to the main frame about an axis coincident with the pivotal axis of the auxiliary frame and the auxiliary and main frames being movable into substantial alignment with the pivotal axis substantially over the wheel axle when the device is to be wheeled, while, when the legs are brought into contact with the ground the auxiliary frame is inclined rearwardly of the main frame and the pivotal axis is intermediate of the points of support on the ground of the wheels and legs respectively.

2. A folding two-wheeled baby carriage comprising in combination a main substantially U-shaped frame, one end of which forms the handle while the other ends form the supporting legs, an auxiliary frame carrying the wheel axle and pivoted to the main frame, a carrier frame also pivoted to the main frame about an axis coincident with the pivotal axis of the auxiliary frame and a link structure connecting the carrier frame to a point on the main frame spaced from the pivotal axis of the carrier frame for normally preventing relative movement between the carrier frame and the main frame.

3. A folding two-wheeled baby carriage according to claim 1 in which a collapsible link structure connects the carrier frame to a point on the main frame's base from the pivotal axis of the carrier frame for normally preventing relative movement between the carrier frame and the main frame.

BARRY SIMPSON.

REFERENCES CITED

The following references are of record in the file of this patent:

UNITED STATES PATENTS

| Number | Name | Date |
|---|---|---|
| 1,208,109 | Decker | Dec. 12, 1916 |
| 1,697,325 | Black | July 31, 1928 |

FOREIGN PATENTS

| Number | Country | Date |
|---|---|---|
| 418,701 | Great Britain | Oct. 30, 1934 |